United States Patent
Langlais et al.

(10) Patent No.: US 8,464,786 B2
(45) Date of Patent: Jun. 18, 2013

(54) NON BASEPIPE-WELDED ACCESSORY ATTACHMENT

(75) Inventors: Michael D. Langlais, Houston, TX (US); Tage Thorkildsen, Raege (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 367 days.

(21) Appl. No.: 12/840,043

(22) Filed: Jul. 20, 2010

(65) Prior Publication Data

US 2012/0018998 A1 Jan. 26, 2012

(51) Int. Cl.
*E21B 23/01* (2006.01)

(52) U.S. Cl.
USPC .............. 166/139; 166/124; 166/217

(58) Field of Classification Search
USPC ............ 166/120, 123, 124, 138, 139, 217
See application file for complete search history.

(56) References Cited

U.S. PATENT DOCUMENTS

| | | | |
|---|---|---|---|
| 4,105,262 A | 8/1978 | Richey | |
| 4,296,806 A * | 10/1981 | Taylor et al. | 166/120 |
| 4,438,822 A | 3/1984 | Russell | |
| 4,524,825 A * | 6/1985 | Fore | 166/139 |
| RE31,933 E * | 7/1985 | Taylor et al. | 166/120 |
| 4,600,063 A | 7/1986 | Beasley | |
| 4,630,690 A | 12/1986 | Beasley | |
| 4,665,977 A * | 5/1987 | Mullins | 166/139 |
| 4,732,212 A * | 3/1988 | Fraser, III | 166/217 |
| 5,706,894 A * | 1/1998 | Hawkins, III | 166/217 |
| 5,860,760 A | 1/1999 | Kirk | |
| 6,006,830 A | 12/1999 | Barron et al. | |
| 7,017,672 B2 * | 3/2006 | Owen, Sr. | 166/123 |
| 7,487,832 B2 * | 2/2009 | Read, Jr. | 166/123 |
| 7,789,137 B2 * | 9/2010 | Turley et al. | 166/138 |
| 8,069,918 B2 * | 12/2011 | Zimmerman et al. | 166/217 |
| 2005/0045329 A1 * | 3/2005 | Wetzel et al. | 166/278 |
| 2009/0229823 A1 | 9/2009 | Moen et al. | |

OTHER PUBLICATIONS

International Search Report and Written Opinion dated Dec. 23, 2011 for corresponding PCT Application No. PCT/US2011/043966 filed Jul. 14, 2011.

* cited by examiner

*Primary Examiner* — Frederick L Lagman
(74) *Attorney, Agent, or Firm* — David G. Matthews; Brandon Clark; Robb D. Edmonds

(57) ABSTRACT

A gripping apparatus is provided having a stop collar with an accessory hardware coupled or otherwise attached thereto so as to not weld the accessory hardware directly to a production tubular. The gripping apparatus is adapted to grippingly engage the production tubular for downhole hydrocarbon recovery applications, and the accessory hardware can be a bracket or ring configured to support alternate path shunt tubes. The stop collar can also include centralizer blades coupled directly thereto, instead of welding the centralizer blades to the production tubular.

23 Claims, 3 Drawing Sheets

NON BASEPIPE-WELDED ACCESSORY ATTACHMENT

BACKGROUND

The conventional method for attaching hardware, such as support brackets and rings for alternate path shunt tubes and bladed centralizers, to oilfield sand screen tubulars and other downhole equipment involves welding such components directly to the production tubular. Welding creates residual stresses in the tubular that can eventually lead to stress or corrosion cracking, surface cracks, and other defects that can ultimately result in the failure of the tubular. However, most welding procedures generally include a post-weld heat treatment designed to minimize the residual stresses and increase the strength of the tubular near the weld joint by re-homogenizing the crystalline structure of the tubular material. However, with increasingly sophisticated metallurgy, such as 25CR-125ksi material commonly used in downhole applications, regaining vital strength properties of the tubular is simply not possible through post-weld heat treatments. Consequently, in applications using modern metallurgy, welding directly to the production tubular will ultimately result in the tubular having reduced strength characteristics as a result of the residual stresses on the tubular.

Moreover, in order to comply with downhole drilling regulations, the tubular weld must also be thoroughly inspected in an effort to identify any weld defects that could eventually propagate into cracks and lead to tubular failure. This inspection is commonly undertaken via non-destructive weld examination methods, such as liquid penetrant inspection. Like many other non-destructive weld inspection methods, liquid penetrant inspection requires an in-depth system of quality control documents, traceability, and personnel training which are inherently time consuming and cost prohibitive for many applications.

There is a need, therefore, for a system and method of attaching downhole equipment hardware to production tubulars without welding such equipment thereto and thereby compromising the structural integrity of the tubular and requiring costly post-weld treatments or inspections.

SUMMARY

Embodiments of the disclosure can provide a gripping assembly. The gripping assembly can include an annular main body having threaded first and second ends, a lead ring threadably coupled to the first end, and a packer ring threadably coupled to the second end. The gripping assembly can further include a first lock ring disposed between the lead ring and the first end, and a second lock ring disposed between the packer ring and the second end, wherein tightening the lead ring to the first end and tightening the packer ring to the second end biases the first and second lock rings into gripping engagement with an adjacent production tubular, thereby preventing axial movement of the gripping assembly. In one embodiment, an accessory hardware can be coupled to the packer ring. In another embodiment, one or more centralizer blades can be coupled to the annular main body.

BRIEF DESCRIPTION OF THE DRAWINGS

So that the recited features can be understood in detail, a more particular description, briefly summarized above, may be had by reference to one or more embodiments, some of which are illustrated in the appended drawings. It is to be noted, however, that the appended drawings illustrate only typical embodiments and are therefore not to be considered limiting of its scope, for the invention may admit to other equally effective embodiments.

DETAILED DESCRIPTION

Figure 1:
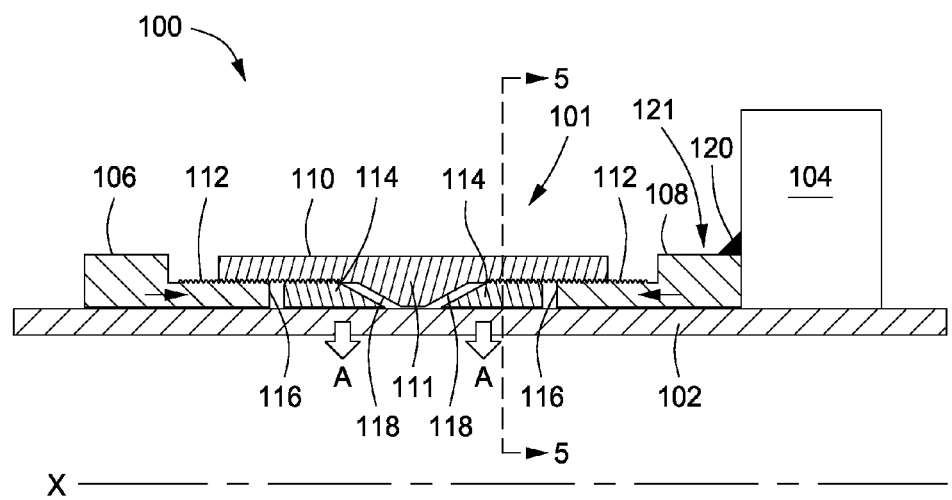
FIG. 1 depicts a cross-sectional view of a gripping assembly, according to one or more exemplary embodiments described.
Figure 2:
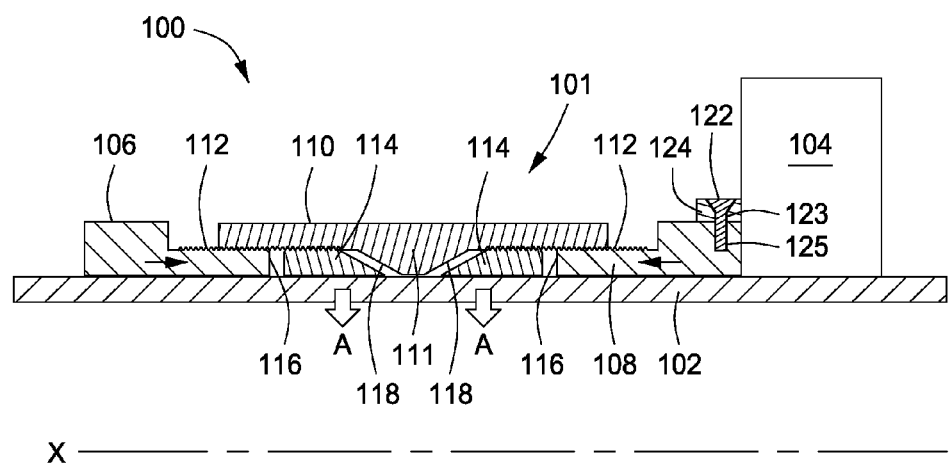
FIG. 2 depicts another cross-sectional view of the gripping assembly of FIG. 1, according to one or more exemplary embodiments described.
Figure 3:
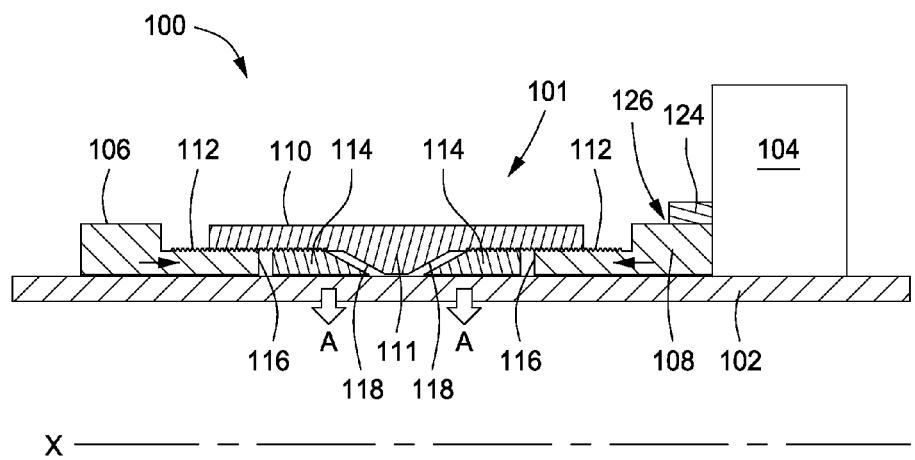
FIG. 3 depicts another cross-sectional view of the gripping assembly of FIG. 1, according to one or more exemplary embodiments described.

FIGS. 1-3 depict a cross-sectional view of a gripping assembly 100, according to one or more embodiments of the disclosure. In an embodiment, the gripping assembly 100 can be securely coupled to a production tubular 102 having a central axis X without requiring welding processes that can create adverse consequences, as described above. Moreover, the gripping assembly 100 can facilitate attachment of downhole accessory hardware 104, such as support brackets/rings, centralizer blades 402 (FIG. 4), or other downhole tools and components, whereas before such accessory hardware 104 would be welded directly to the production tubular 102.

The gripping assembly 100 can include a stop collar 101 disposed around the production tubular 102 and adapted to couple to or grip the production tubular 102 without requiring welding thereto. The stop collar 101 can be dimensioned as a clearance fit around the production tubular 102. In one or more embodiments, the stop collar 101 can be made of materials adapted to minimize post-weld heat-treating requirements. For example, the stop collar 101 can be made of steel, such as 316L stainless steel or comparable carbon steels that exhibit similar strength characteristics. In other embodiments, cold-worked state 825 metal alloys can be used. In at least one embodiment, the material for the stop collar 101 can be chosen based on general weldability characteristics, since accessory hardware 104 and/or centralizer blades 402 (FIG. 4) may be welded thereto according to the disclosure.

The stop collar 101 can include a lead ring 106, a packer ring 108, and a generally annular main body 110. The main body 110 can include a central portion 111 defining opposing tapered faces 118. In at least one embodiment, the main body 110 can be threadably engageable with the lead ring 106 and packer ring 108 via threads 112 disposed at opposing ends of the main body 110. One or more lock rings 114 can generally be positioned between the tapered faces 118 of the main body 110 and an axial end 116 of each of the lead ring 106 and packer ring 108. In an embodiment, each lock ring 114 can be designed as a slip wedge configured to grippingly engage the outer surface of the production tubular 102 in the direction of arrows A when fully engaged. To facilitate a strong gripping or biasing engagement to the production tubular 102, the lock rings 114 can be made of silicon carbide or similar materials.

Moreover, the gripping engagement between the lock rings 114 and the tubular 102 can be improved by applying a friction coating to the outer surface of the production tubular 102 or to the inner annular engaging surface of the lock ring 114.

To grippingly engage the stop collar 101 to the production tubular 102, the lead ring 106 and packer ring 108 can be threaded onto opposing ends of the main body 110 via the threads 112. As each ring 106, 108 is tightened toward the main body 110, the lock rings 114 can translate or move until eventually engaging both the axial end 116 of each ring 106, 108 and the tapered faces 118 of the main body 110, thereby becoming wedged between the tapered faces 118 and the outer surface of the production tubular 102. This biasing engagement generates the gripping action of the stop collar 101 so that when an axial force is applied to the stop collar 101, movement of either lock ring 114 in the corresponding axial direction is minimized or substantially prevented.

With the stop collar 101 secured to the production tubular 102, accessory hardware 104 can be coupled or otherwise attached to the stop collar 101. As described above, the accessory hardware 104 can include brackets, rings, other downhole components and tools configured to provide support for, among other devices, alternate path shunt tubes or tubular shrouds commonly used in downhole completion assembly applications. As will be described below, the accessory hardware 104 can be coupled or otherwise attached to the stop collar 101 via a variety of attachment methods including, but not limited to, welding, mechanically fastening, adhesively fastening, and threadably engaging. It should be noted, however, that several variations of the attachment methods disclosed herein can be undertaken without departing from the scope of the disclosure, including using any of the attachment methods individually or in combination.

As depicted in FIG. 1, the accessory hardware 104 can be welded to the stop collar 101. Specifically, the accessory hardware 104 can be welded to the packer ring 108 by a weld 120 placed on the outer surface 121 of the packer ring 108. As can be appreciated, however, other embodiments contemplate welding the accessory hardware 104 to the lead ring 106 or the main body 110, without departing from the scope of the disclosure.

As depicted in FIG. 2, the accessory hardware 104 can be mechanically fastened to the stop collar 101 via one or more threaded screws 122 (one shown). Specifically, the accessory hardware 104 can include a shoulder 124 configured to align one or more through-holes 123 (one shown) defined therein with corresponding threaded perforations 125 (one shown) defined in the packer ring 108. In one or more embodiments, a plurality of through holes 123 and corresponding threaded perforations 125 can be equidistantly spaced about the circumference of the production tubular 102. Threaded screws 122 can then be used to secure the accessory hardware 104 to the stop collar 101. Other embodiments contemplate threadably securing the accessory hardware 104 to the lead ring 106 or the main body 110 with screws 122, without departing from the scope of the disclosure. In yet other embodiments, the packer ring 108 can instead include a shoulder (not shown) that extends therefrom and provides the one or more through-holes that correspond with threaded perforations defined in the accessory hardware 104 for threadable attachment.

As depicted in FIG. 3, the accessory hardware 104 can also be threadably engageable directly to the stop collar 101. Specifically, the shoulder 124 of the accessory hardware 104 and the packer ring 108 can include a threaded engagement 126, thereby allowing the accessory hardware 104 to be threadably attached directly to the stop collar 101. Other embodiments contemplate threadably securing the accessory hardware 104 to the lead ring 106, without departing from the scope of the disclosure.

Aligning the production tubular 102 between succeeding and preceding production tubulars 102 is crucial for effective hydrocarbon recovery. For example, in applications attaching brackets for alternate path shunt tubes, the brackets must be aligned from tubular to tubular so that succeeding/preceding shunt tubes can be coupled together and remain coupled during operation. If the threads 112 on the stop collar 101 reverse during operation, succeeding/preceding accessory hardware 104 may not align properly. Therefore, in at least one embodiment, a thread-locking fluid or threadlocker can be applied to the threads 112 to prevent thread reversal during production applications. For example, LOCTITE®, or a similar thread-locking adhesive can be applied to prevent thread reversal. Likewise, thread-locking fluid can be applied to any threaded engagement in the embodiments disclosed herein, such as the threaded screws 122 or threaded engagement 126, to thereby prevent thread reversal and minimize its adverse effects.

In other embodiments, the threads 112 can be prevented from reversing by tapping threaded holes through the main body 110 and into either or both of the lead ring 106 and the packer ring 108. The engagement can then be locked by threading in a grub screw, an inverted shoulder screw (not shown), or the like. Alternatively, the lead ring 106 and/or the packer ring 108 can be tapped and configured to correspond to through-holes defined within the main body 110, wherein shoulder screws can be used to secure the engagement.

Figure 4:
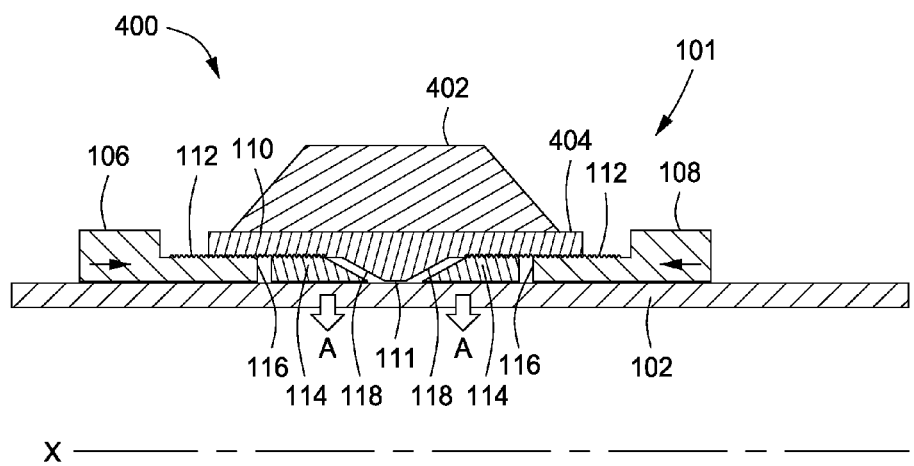
FIG. 4 depicts a cross-sectional view of another gripping assembly, according to one or more exemplary embodiments described.

Referring now to FIG. 4, depicted is another gripping assembly 400, according to one or more embodiments. The gripping assembly 400 is substantially similar to the gripping assembly 100 described above, thus like numbers are used to describe like parts. As depicted, the gripping assembly 400 can include one or more centralizer blades 402 (one shown) coupled or otherwise attached to the stop collar 101. In one or more embodiments, there can be three or more centralizer blades 402 spaced about the outer diameter or circumference of the stop collar 101 and configured to centralize the production tubular 102 within a wellbore or casing. While not necessary, in at least one embodiment the centralizer blades 402 are equidistantly-spaced about the outer diameter or circumference of the stop collar 101.

The centralizer blades 402 can be coupled or otherwise attached to the stop collar 101 via a variety of attachment methods including, but not limited to, welding, mechanically fastening, adhesively fastening, and threadably engaging. As can be appreciated, several variations of the attachment methods disclosed herein can be undertaken without departing from the scope of the disclosure, including using any of the attachment methods individually or in combination.

Specifically, the centralizer blades 402 can be welded to the outer surface 404 of the main body 110. In other embodiments, the centralizer blades 402 can be mechanically fastened to the main body 110 via, for example, a plurality of screws or bolts (not shown). In other embodiments, the centralizer blades 402 can be adhesively attached to the main body 110, such as with a high-strength industrial adhesive adapted for use in a downhole environment, or threadably engaged with the main body 110 via threads (not shown) defined between the main body 110 and the centralizer blades 402. As can be appreciated, however, the centralizer blades 402 can be attached to any portion of the stop collar 101 without departing from the scope of the present disclosure.

The embodiments disclosed herein provide hardware accessories 104 and centralizer blades 402 that are not welded directly to the production tubular 102, which can compromise the structural integrity of the tubular 102. Eliminating welding to the tubular 102 can also serve to eliminate a significant amount of time and expense required for post-weld quality control, including personnel time and regulatory documentation. Moreover, the embodiments disclosed herein allow for simplified axial translation of the gripping assemblies 100, 400 to accommodate changing wellbore needs for a variety of downhole applications.

Figure 5:
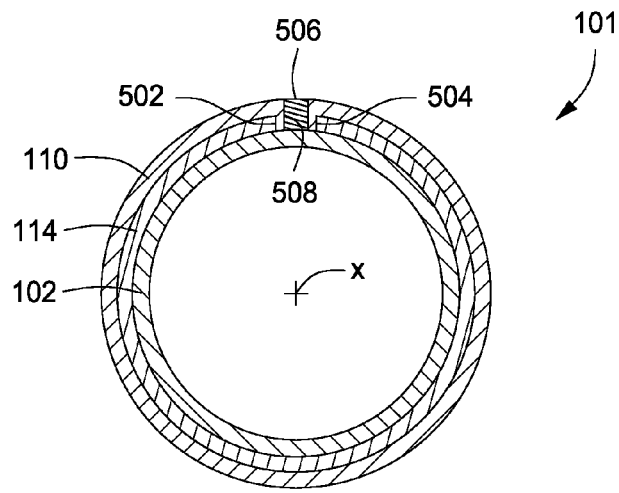
FIG. 5 depicts an axial cross-sectional view of the gripping assembly taken along lines 5-5 in FIG. 1.
Figure 6:
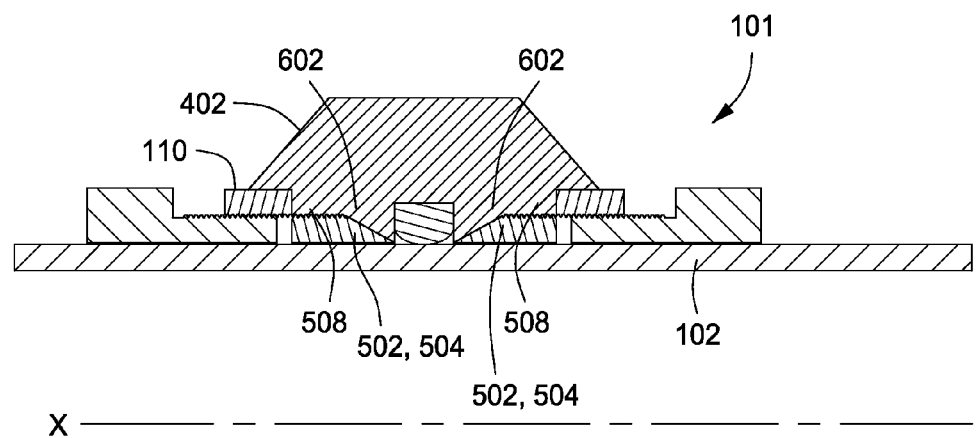
FIG. 6 depicts a cross-sectional view of another gripping assembly, according to one or more exemplary embodiments described.

Referring now to FIGS. 5 and 6, embodiments are depicted that can increase the torsion load resistance of the stop collar 101 when engaged as generally described herein. Specifically, FIG. 5 is an axial view taken from FIG. 1 along lines 5-5 and depicts the main body 110 disposed about the lock ring 114, which is in turn disposed about the pipe 102. In an embodiment, the lock ring 114 can be a split lock ring, thereby including a first end 502 and a second end 504. As can be appreciated, a split lock ring can allow the lock ring 114 to squeeze or otherwise contract circumferentially around the pipe 102 when engaged, thereby resulting in a more uniform gripping engagement about the pipe 102.

To prevent axial rotation of the lock ring 114, and thereby increase its torsion load resistance, a stop device 506 can be inserted into a hole 508 defined within the main body 110 and ultimately between the ends 502,504 of the lock ring 114. As can be appreciated, one or more holes 508 can be defined within the main body 110 to allow one or more stop devices 506 to be inserted between the first and second ends 502,504 of at least two lock rings 114.

In at least one embodiment, the hole 508 may be threaded and the stop device 506 can be a screw threadably engagable with the hole 508. In other embodiments, the stop device 506 can be a pin inserted or otherwise disposed within the hole 508. Alternatively, the stop device 506 can be an elongated boss or wedge disposed a short distance along the axial length of the pipe 102.

FIG. 6 depicts another embodiment where the stop device 506 can include one or more radial extensions 602 extending radially inward from one or more centralizer blades 402. The centralizer blade(s) 402 can be similar to the centralizer blade(s) generally described herein with reference to FIG. 4, and therefore will not be described again in detail. To prevent axial rotation of the lock ring(s) 114, the radial extensions 602 can be configured to radially extend inwardly through the hole 508 and inserted between the ends 502,504 of the lock ring(s) 114. As can be appreciated, the hole 508 can be an opening defined in the main body 110. Once inserted between the ends 502,504 of the lock ring(s) 114, the radial extensions 602 can serve to prevent rotation of the lock ring(s) 114 about the circumference of the pipe 102, thereby increasing torsion load resistance on the pipe 102.

Figure 7:
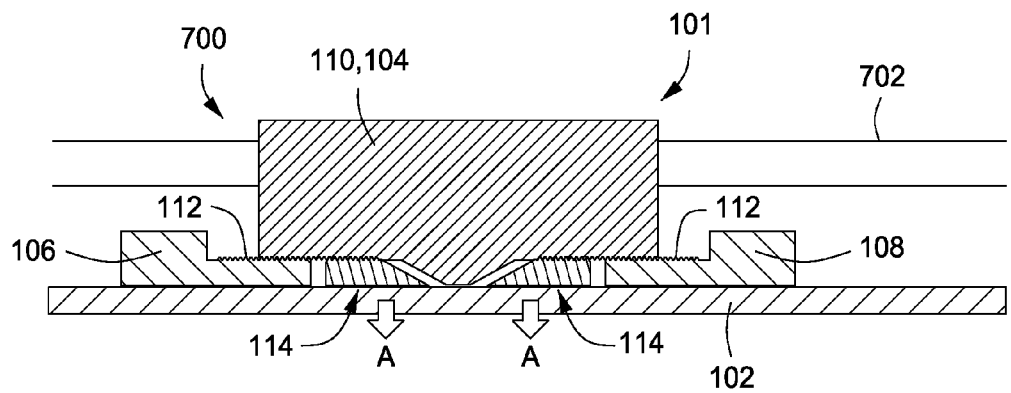
FIG. 7 depicts a cross-sectional view of another gripping assembly, according to one or more exemplary embodiments described.

Referring now to FIG. 7, depicted is another gripping assembly 700, according to one or more embodiments. The gripping assembly 700 is substantially similar to the gripping assemblies 100, 400 described above, thus like numbers are used to describe like parts. As depicted, the main body 110 of the stop collar 101 and the accessory hardware 104 can be one and the same. In other words, the accessory hardware 104 need not be attached or coupled to the main body 110, but instead forms an integral part thereof that can be manufactured as a one-piece device. Consequently, the main body 110 can be designed or otherwise manufactured to serve a dual purpose as the main body 110 and simultaneously as an accessory hardware 104.

As depicted in the illustrative embodiment of FIG. 7, the accessory hardware 104 can be a manifold or bracket used to grasp or otherwise suspend or support a shunt tube 702 in an alternate path shunt system. In other embodiments, however, the hardware 104 can include rings, or other downhole components and tools configured to provide support for, among other devices, alternate path shunt tubes or tubular shrouds commonly used in downhole completion assembly applications. In at least one embodiment, the accessory hardware 104 can include one or more centralizer blades 402, such as those described with reference to FIGS. 4 and 6, without departing from the scope of the disclosure.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A gripping assembly, comprising:
   an annular main body having a central portion defining opposing first and second tapered surfaces;
   a lead ring threadably coupled to the main body;
   a packer ring threadably coupled to the main body;
   a first lock ring slidably disposed between the lead ring and the first tapered surface, wherein an end of the lead ring abuts an end of the first lock ring;
   a second lock ring slidably disposed between the packer ring and the second tapered surface, wherein tightening the lead ring to the main body and tightening the packer ring to the main body forces the first and second lock rings into gripping engagement between the opposing first and second tapered surfaces and an outer surface of a production tubular, thereby preventing axial movement of the gripping assembly along the production tubular; and
   an accessory hardware coupled to the packer ring.

2. The gripping apparatus of claim 1, wherein the first and second lock rings are split lock rings, and wherein the first and second lock rings are completely disposed between the main body and the production tubular.

3. The gripping apparatus of claim 2, further comprising one or more stop devices introduced into one or more holes defined within the annular main body, the one or more stop devices being inserted at least partially through the first and second split lock rings.

4. The gripping apparatus of claim 3, wherein the one or more stop devices comprises a threaded screw and the one or more holes threadably receives the threaded screw.

5. The gripping apparatus of claim 3, wherein the one or more stop devices comprises an elongated boss or wedge disposed axially along the production tubular.

6. The gripping apparatus of claim 1, wherein the accessory hardware comprises a bracket or ring configured to provide support for alternate path shunt tubes in a completion assembly.

7. The gripping apparatus of claim 1, wherein the accessory hardware is coupled to the packer ring by mechanically fastening the accessory hardware to the packer ring via one or more screws.

8. The gripping apparatus of claim 1, wherein the accessory hardware further comprises a threaded shoulder coupled to the packer ring by threadably engaging the threaded shoulder directly to the packer ring.

9. The gripping apparatus of claim 1, wherein the accessory hardware is coupled to the packer ring by welding the accessory hardware to the packer ring.

10. The gripping apparatus of claim 1, wherein the accessory hardware is coupled to the lead ring.

11. The gripping apparatus of claim 1, wherein an end of the packer ring abuts an end of the second lock ring.

12. A gripping apparatus, comprising:
an annular main body having a central portion defining opposing first and second tapered surfaces;
a lead ring threaded to the main body;
a packer ring threaded to the main body;
a first lock ring slidably disposed between the lead ring and the first tapered surface, wherein an end of the lead ring abuts an end of the first lock ring, and a second lock ring slidably disposed between the packer ring and the second tapered surface, wherein tightening the lead ring to the main body and tightening the packer ring to the main body forces the first and second lock rings into gripping engagement between the opposing first and second tapered surfaces and an outer surface of a production tubular, thereby preventing axial movement of the gripping assembly along the production tubular; and
one or more centralizer blades coupled to an outer surface of the annular main body and extending radially therefrom.

13. The gripping apparatus of claim 12, wherein the centralizer blades are coupled to the outer surface of the annular main body by welding the centralizer blades to the outer surface of the annular main body.

14. The gripping apparatus of claim 12, wherein the centralizer blades are coupled to the outer surface of the annular main body by mechanically fastening the centralizer blades to the outer surface of the annular main body.

15. The gripping apparatus of claim 12, wherein the centralizer blades are coupled to the outer surface of the annular main body by threadably engaging the centralizer blades to the outer surface of the annular main body.

16. The gripping apparatus of claim 12, wherein an end of the packer ring abuts an end of the second lock ring.

17. A gripping apparatus, comprising:
an annular main body having a central portion defining opposing first and second tapered surfaces, the annular main body further comprising an accessory hardware component;
a lead ring threaded to the main body;
a packer ring threaded to the main body; and
a first split lock ring slidably disposed between the lead ring and the first tapered surface, wherein an end of the lead ring abuts an end of the first split lock ring, and a second split lock ring slidably disposed between the packer ring and the second tapered surface, and wherein tightening the lead ring to the main body and tightening the packer ring to the main body forces the first and second split lock rings into gripping engagement between the opposing first and second tapered surfaces and an outer surface of a production tubular, thereby preventing axial movement of the gripping assembly along the production tubular.

18. The gripping apparatus of claim 17, wherein the accessory hardware component is a bracket for suspending a shunt tube in an alternate path shunt system.

19. The gripping apparatus of claim 17, wherein the accessory hardware component comprises one or more centralizer blades.

20. The gripping apparatus of claim 17, further comprising one or more stop devices introduced into one or more holes defined within the annular main body, the one or more stop devices being inserted at least partially through the first and second split lock rings.

21. The gripping apparatus of claim 20, wherein the one or more stop devices comprises a threaded screw and the one or more holes threadably receives the threaded screw.

22. The gripping apparatus of claim 20, wherein the one or more stop devices comprises an elongated boss or wedge disposed axially along the production tubular.

23. The gripping apparatus of claim 17, wherein an end of the packer ring abuts an end of the second split lock ring.

* * * * *